US008847731B2

(12) United States Patent
Tieman

(10) Patent No.: US 8,847,731 B2
(45) Date of Patent: Sep. 30, 2014

(54) SYSTEM AND METHOD FOR COMMUNICATING WITH A VEHICLE

(75) Inventor: Craig A. Tieman, Westfield, IN (US)

(73) Assignee: Samsung Electronics Co., Ltd., Suwon-si (KR)

(*) Notice: Subject to any disclaimer, the term of this patent is extended or adjusted under 35 U.S.C. 154(b) by 634 days.

(21) Appl. No.: 13/171,963

(22) Filed: Jun. 29, 2011

(65) Prior Publication Data

US 2011/0257817 A1    Oct. 20, 2011

Related U.S. Application Data

(63) Continuation-in-part of application No. 11/973,716, filed on Oct. 10, 2007, now abandoned.

(51) Int. Cl.
| | | |
|---|---|---|
| G05B 19/00 | (2006.01) | |
| G05B 23/00 | (2006.01) | |
| G08B 29/00 | (2006.01) | |
| B60Q 1/00 | (2006.01) | |
| B60R 25/10 | (2013.01) | |
| B60R 25/24 | (2013.01) | |
| G07C 5/00 | (2006.01) | |
| G07C 9/00 | (2006.01) | |

(52) U.S. Cl.
CPC ............ *G07C 9/00309* (2013.01); *G07C 5/008* (2013.01); *G07C 2009/00388* (2013.01); *B60R 2325/101* (2013.01); *B60R 25/24* (2013.01); *G07C 2009/00793* (2013.01); *B60R 2325/205* (2013.01)
USPC ......... 340/5.62; 340/5.72; 340/5.64; 340/5.8; 340/425.5; 340/426.36; 340/426.1; 340/426.26; 340/426.16

(58) Field of Classification Search
USPC .................. 340/5.62, 5.72, 5.64, 5.8, 425.5, 340/426.36, 426.1, 426.16; 701/200–226; 455/404.1, 425, 552.1, 556.1
See application file for complete search history.

(56) References Cited

U.S. PATENT DOCUMENTS

| | | | | | |
|---|---|---|---|---|---|
| 5,864,297 | A | * | 1/1999 | Sollestre et al. ............. | 340/5.23 |
| 6,169,497 | B1 | * | 1/2001 | Robert .......................... | 340/988 |

(Continued)

FOREIGN PATENT DOCUMENTS

| | | |
|---|---|---|
| EP | 1216899 A1 | 6/2002 |
| EP | 1216900 A1 | 6/2002 |

OTHER PUBLICATIONS

European Search Report dated Jul. 10, 2012.

(Continued)

*Primary Examiner* — Jennifer Mehmood
*Assistant Examiner* — Mirza Alam
(74) *Attorney, Agent, or Firm* — NSIP Law

(57) ABSTRACT

A system for communicating with a vehicle includes a control module equipped with a remote keyless entry (RKE) receiver and configured to control vehicle functions in response to a RKE signal. The system includes a fob equipped with a RKE transmitter and a short range transceiver, such as BLUE-TOOTH™, IEEE 802.11, or near field communication (NFC). The fob transmits a RKE signal in response to receiving a message from a consumer device, such as a cellular phone, smart phone, tablet computer, or personal computer equipped with a short range transceiver, enabling the user to control the vehicle from the consumer device. The system may be configured to transmit vehicle status information to the consumer device. The control module may include a third short range transceiver that communicates with the consumer device when the distance is between the vehicle and the consumer device is less than the distance threshold.

15 Claims, 4 Drawing Sheets

(56) References Cited

U.S. PATENT DOCUMENTS

| | | | |
|---|---|---|---|
| 6,631,271 B1* | 10/2003 | Logan | 455/456.1 |
| 6,917,801 B2* | 7/2005 | Witte et al. | 455/418 |
| 7,042,342 B2 | 5/2006 | Luo et al. | |
| 7,504,931 B2* | 3/2009 | Nguyen | 340/426.36 |
| 2002/0107010 A1 | 8/2002 | Witte et al. | |
| 2002/0146999 A1 | 10/2002 | Witte et al. | |
| 2003/0134600 A1 | 7/2003 | Picone et al. | |
| 2005/0195775 A1* | 9/2005 | Petite et al. | 370/338 |
| 2006/0049922 A1 | 3/2006 | Kolpasky et al. | |
| 2006/0052140 A1 | 3/2006 | Hicks, III | |
| 2006/0091997 A1 | 5/2006 | Connet et al. | |
| 2006/0114100 A1 | 6/2006 | Ghabra et al. | |
| 2006/0145810 A1 | 7/2006 | Buccinna et al. | |
| 2006/0222120 A1 | 10/2006 | Yegin et al. | |
| 2007/0085656 A1 | 4/2007 | Tang et al. | |
| 2007/0162229 A1 | 7/2007 | McCarthy et al. | |
| 2007/0226778 A1* | 9/2007 | Pietruszka | 726/2 |

OTHER PUBLICATIONS

DESen 100144 "Delphi Smart Phone connectivity via Bluetooth Gateway Key Fob", 1 page, Apr. 13, 2010.

DESen 100145 "Delphi Smart Phone Connectivity via Near Field Communication (NFC) Gateway Key Fob", 1 page, Apr. 13, 2010.

Press Release, "Delphi's New Key Fob Technology Helps Make Smart Phone Connectivity Available at Low Cost", http://delphi.com/news/pressReleases_2010, 2 pages, Apr. 13, 2010.

* cited by examiner

SYSTEM AND METHOD FOR COMMUNICATING WITH A VEHICLE

CROSS-REFERENCE TO RELATED APPLICATION

This application is a continuation-in-part application and claims the benefit under 35 U.S.C. §120 of U.S. patent application Ser. No. 11/973,716, filed Oct. 10, 2007, the entire disclosure of which is hereby incorporated herein by reference.

TECHNICAL FIELD OF INVENTION

The invention generally relates to a system for communicating with a vehicle, and more particularly relates to a system communicating with the vehicle from a consumer device.

BACKGROUND OF INVENTION

Remote keyless entry (RKE) systems for vehicles have been available for many years. A fob is equipped with push-buttons that, when depressed, cause a RKE transmitter in the fob to transmit a short range signal to the RKE system in the vehicle which validates the signal and decodes the particular vehicle function to be executed while sending a signal to the particular vehicle system to effect the desired function control.

Typically, a fob allows the user to lock and unlock the vehicle doors, open the vehicle trunk, and sound a vehicle alarm or horn in an emergency. However, recent trends in remote vehicle access and control continue to expand beyond the basic short-range, unidirectional remote keyless entry systems toward longer range, bidirectional communication systems or smart fobs, that have many features, including vehicle access, vehicle immobilizer, keyless engine start, panic button, remote start, vehicle locating, and vehicle status information polling. Typically, these smart fobs rely upon direct radio frequency communication between the smart fob and the vehicle at 315, 433, or 868 MHz using dedicated communication channels.

It would be desirable to provide an enhanced vehicle remote access and control system which provides an interface to owner-consumer devices, such as cellular phones, PDAs, personal computers, tablet computers, etc., while maintaining the security features of the RKE system.

SUMMARY OF THE INVENTION

A system for communicating with a vehicle includes a control module configured to be mounted in the vehicle, a portable fob, and a consumer device. The control module includes a first RKE receiver. The control module is further configured to control a vehicle function in response to a RKE signal received by the first RKE receiver. The fob is equipped with a first RKE transmitter and a first short range transceiver. The first RKE transmitter is configured to transmit the RKE signal in response to the first short range transceiver receiving a gateway message via a first communication gateway. The consumer device is equipped with a second short range transceiver. The consumer device is configured to transmit the gateway message to the first short range transceiver via the first communication gateway in response to an action by a user, and thereby enable the user to control the vehicle function from the consumer device via the fob.

The control module may be equipped with a second RKE transmitter and the fob may be equipped with a second RKE receiver. The system may be configured to communicate a vehicle status message from the control module to the consumer device via the fob.

The control module may also include a third short range transceiver configured to receive the gateway message via a second communication gateway. The consumer device may be configured to transmit the gateway message to the third short range transceiver via the second communication gateway in response to the action by the user and thereby enable the user to control the vehicle function from the consumer device without the fob. The system may be configured such that the second short range transceiver communicates a gateway message to the first short range transceiver via the first communication gateway if a communication distance between the vehicle and the consumer device is greater than a distance threshold, and the second short range transceiver transmits a gateway message to the third short range transceiver via the second communication gateway if the communication distance is less than the distance threshold.

A method of controlling a vehicle device in a vehicle equipped with a control module configured to control a vehicle function in response to a RKE signal may include a step of detecting an action by a user of a consumer device. The method may include a step of transmitting a gateway message to the fob via the first communication gateway. The gateway message may be based on the action by the user of the consumer device. The method may also include a step of transmitting the RKE signal corresponding to the gateway message from the fob to the control module. The method may include a step of controlling the vehicle function in response to the action by the user of the consumer device.

The system described herein maintains the data security for signals between the vehicle and the fob provided by a fob-operated RKE system while providing enhanced data security with the consumer device due to the use of wireless local area network transceivers. The consumer device affords a wider range of human to machine interface (HMI) capability, including large color screens, keyboards, reconfigurable touch pads, Internet access, etc. than a typical RKE fob. The system also allows the consumer device to communicate directly with the vehicle if the communication distance between the vehicle and the consumer device is less than a distance threshold without the need for cellular phone subscription fees.

BRIEF DESCRIPTION OF DRAWINGS

The present invention will now be described, by way of example with reference to the accompanying drawings, in which.

DETAILED DESCRIPTION OF INVENTION

Figure 1:
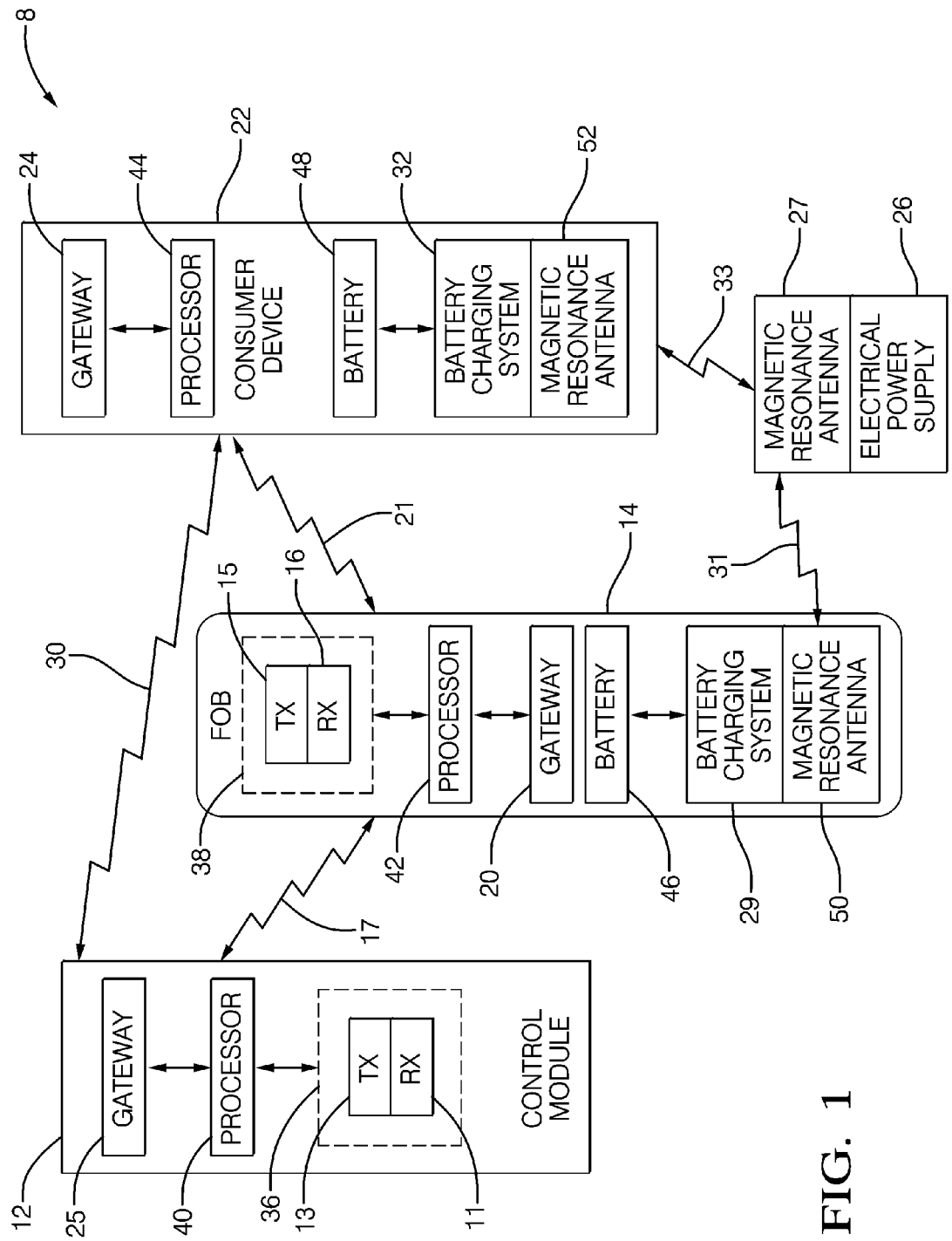
FIG. 1 is a block diagram of a system for communicating with a vehicle in accordance with an embodiment.

While the specification concludes with claims defining the features of the invention that are regarded as novel, it is believed that the invention will be better understood from a consideration of the following description in conjunction with the drawing figures, in which like reference numerals are carried forward.

As used herein, a receiver is a device that receives radio frequency signals, a transmitter is a device that transmits radio frequency signals, and a transceiver is a device that receives and transmits a radio frequency signal. It is recognized that a transceiver may include, or be formed by a combination of, a receiver and a transmitter.

Referring now to FIG. 1, there is depicted a vehicle remote access and keyless entry (RKE) control apparatus 12, hereafter referred to as a control module 12, mounted on a vehicle 10. The control module 12 is capable of operating or controlling numerous vehicle functions, such as the locking and unlocking of electric door locks, unlatching the trunk latch, activating or disarming the vehicle security system, etc.

Although the control module 12 is described hereafter as being used to control vehicle functions, it will be understood that the control module 12 can be used to control any function in any appropriate system.

The control module 12 utilizes a receiver 11 hereafter referred to as a first RKE receiver 11 mounted in the vehicle 10 which receives a signal 17, hereafter referred to as a RKE signal 17, from a remotely located transmitter 15, hereafter referred to as a first RKE transmitter 15, typically mounted in a portable fob 14 hereafter referred to as a fob 14. The fob 14 is depicted, by example only, as being separate from the vehicle key. It will be understood that the fob 14 can also be integrated into the key head.

Figure 2:
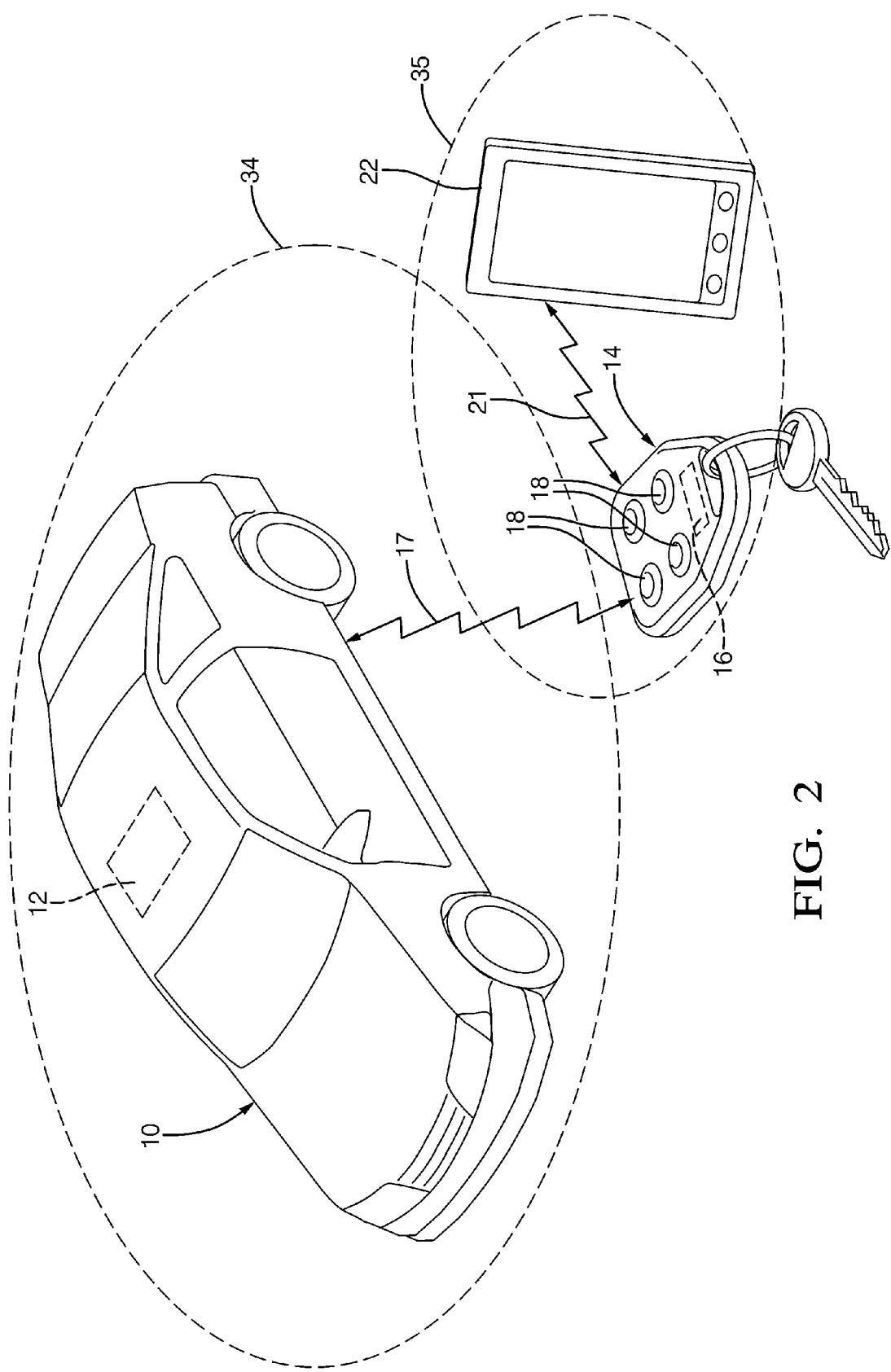
FIG. 2 is a perspective view of a system for communicating with a vehicle in accordance with an embodiment.

Referring now to FIG. 2, as is typical, the fob 14 may include a plurality of operable inputs, such as depressible buttons 18, each of which may include indicia to designate a particular controlled vehicle function. The buttons 18 can be used to control the locking and unlocking of the vehicle door locks, unlatching of the vehicle trunk, as well as deactivating a vehicle alarm, etc. However, the fob 14 may also be configured without buttons or other operable inputs.

Referring again to FIG. 1, a first RKE transmitter 15 typically broadcasts radio frequency signals at a power level dictated by the FCC. The first RKE receiver 11 receives the RKE signal 17 when the fob 14 is within the broadcasting range of the first RKE transmitter 15, typically 30 to 200+ meters. The first RKE receiver 11 and a control module processor 40 determine the validity of the RKE signal 17 sent by the first RKE transmitter 15 for access by the proper RKE transmitter as well as generating signals for controlling the selected vehicle function.

The control module 12 in the vehicle 10 may have a second RKE transmitter 13 and the fob 14 may have a second RKE receiver 16 to enable the control module 12 to send a vehicle initiated RKE signal 17, e.g. an alarm being set off, to the fob 14.

The first RKE receiver 11 and the second RKE transmitter 13 may also be a first RKE transceiver 36. Likewise the first RKE transmitter 15 and a second RKE receiver 16 may be a second RKE transceiver 38 respectively associated therewith in the vehicle 10 and in the fob 14 to enable bidirectional communication of RKE signals 17 between the control module 12 and the fob 14.

A first short range transceiver 20 is mounted in the fob 14. The first short range transceiver 20 may be a BLUETOOTH™ transceiver, an Institute of Electrical and Electronics Engineers (IEEE) 802.11 g/b/a/n transceiver, or Near Field Communication (NFC) transceiver. The first short range transceiver 20 and a second short range transceiver 24 in a consumer device 22 create a first wireless local area network (WLAN) based communication gateway, hereafter referred to a first communication gateway 21, between the fob 14 and the consumer device 22. The second short range transceiver 24 may also be a BLUETOOTH™, IEEE 802.11, or NFC transceiver.

Referring again to FIG. 2, in operation, the fob 14 retains its functionality of maintaining unidirectional or bidirectional, secure communications with the vehicle 10 while exchanging vehicle access, control, and status data with the owner's consumer devices 22 via a gateway message transmitted via the first communication gateway 21. The consumer devices 22 may include a cellular phone, smart phone, PDA, personal computer, tablet computer, home security system, etc.

Referring once more to FIG. 1, the fob 14 is typically powered by an internal fob battery 46. In order to conserve the fob battery's 46 power, an embodiment may include a third short range transceiver 25 incorporated into the control module 12.

Figure 3:
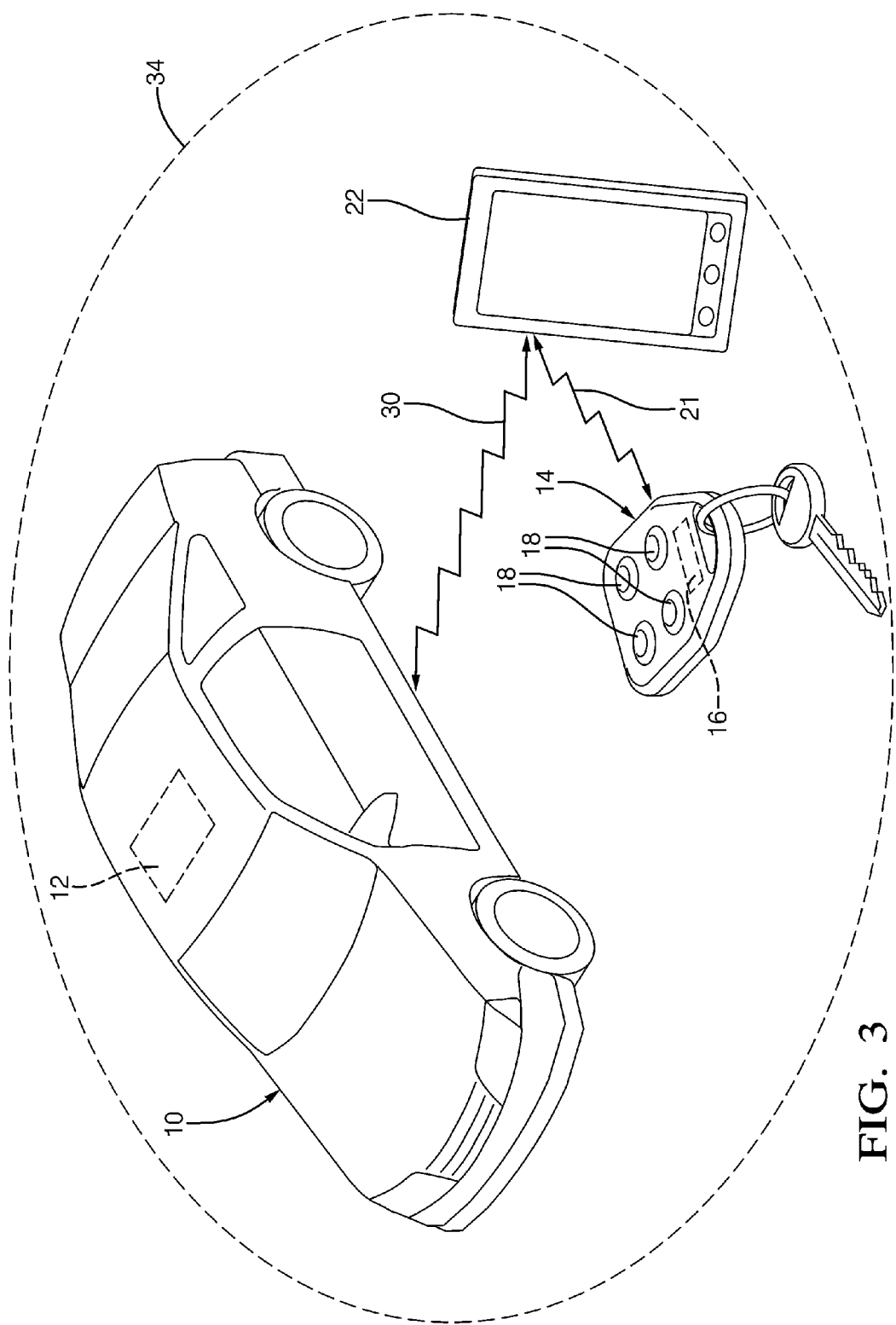
FIG. 3 is a perspective view of a system for communicating with a vehicle in accordance with an embodiment.

Referring now to FIG. 3, the second short range transceiver 24 and the third short range transceiver 25 create a second wireless local area network (WLAN) based communication gateway, hereafter referred to a second communication gateway 30. The third short range transceiver 25 is configured to allow the consumer device 22 to communicate directly with the control module 12 via the second communication gateway 30 if a communications distance between the vehicle 10 and the consumer device 22 is less than a distance threshold 34. The consumer device 22 may send a gateway message to the fob 14 via the first communication gateway 21 commanding the fob 14 to turn off the first RKE receiver 11 and the first RKE transmitter 15, or if so configured the first RKE transceiver 36, to conserve the fob battery's 48 power.

Referring again to FIG. 2, if a communications distance between the vehicle 10 and the consumer device 22 is greater than a distance threshold 34, the consumer device 22 may send a gateway message to the fob 14 via the first communication gateway 21 commanding the fob 14 to turn on the first RKE receiver 11 and the first RKE transmitter 15, or if so configured the first RKE transceiver 36, to enable communication between the consumer device 22 and the control module 12 via the fob 14.

Referring once again to FIG. 1, a system 8 for communicating with a vehicle 10 includes the control module 12, the fob 14, and the consumer device 22. The control module 12 is configured to be mounted in the vehicle 10. The control module 12 includes the first RKE receiver 11. The control module 12 is further configured to control a vehicle function in response to the RKE signal 17 received by the first RKE receiver 11 from the first RKE transmitter 15 in the fob 14. The control module 12 may also include a control module processor 40 configured to interpret RKE signals 17 received by the first RKE receiver 11. The control module processor 40 may be coupled to the vehicle 10. The control module processor 40 may be effective to determine a vehicle status of the vehicle 10 and control a device within the vehicle 10 in response to the RKE signal 17.

The fob 14 is equipped with a first RKE transmitter 15 and a first short range transceiver 20. The first RKE transmitter 15 is configured to transmit the RKE signal 17 in response to the first short range transceiver 20 receiving a gateway message via a first communication gateway 21. The RKE signal 17 sent via the first RKE transmitter 15 corresponds to the gateway message received via the first communication gateway 21. The fob 14 may include a fob processor 42 configured to interpret gateway messages received by the first communication gateway 21 and determine RKE signals 17 transmitted by the first RKE transmitter 15.

Continuing to refer to FIG. 1, the consumer device 22 is equipped with a second short range transceiver 24. The consumer device 22 is configured to transmit the gateway message to the first short range transceiver 20 via the first communication gateway 21 in response to an action by a user and thereby enable the user to control the vehicle function from the consumer device 22 via the fob 14. The consumer device 22 may also include a consumer device processor 44 configured to determine messages transmitted by the second short range transceiver 24 in response to the action by the user and configured to interpret gateway messages received by the first communication gateway 21.

The control module 12 may be equipped with a second RKE transmitter 13. The fob 14 may also equipped with a second RKE receiver 16. Accordingly the system 8 may be configured to communicate a vehicle status message from the control module 12 to the consumer device 22 via the fob 14. The first RKE receiver 11 and the second RKE transmitter 13 may be combined into a first RKE transceiver 36. Likewise, the first RKE transmitter 15 and a second RKE receiver 16 may be combined into a second RKE transceiver 38.

The control module 12 may further include a third short range transceiver 25 configured to receive a gateway message via the second communication gateway 30. The consumer device 22 may be configured to transmit a gateway message from the second short range transceiver 24 to the third short range transceiver 25 in the control module 12 via the second communication gateway 30 in response to the action by a user and thereby enable the user to control the vehicle function from the consumer device 22 without the fob 14.

Referring once more to FIG. 2, the system 8 may be configured such that the second short range transceiver 24 in the consumer device 22 communicates a gateway message to the first short range transceiver 20 in the fob 14 via the first communication gateway 21 if a communication distance between the vehicle 10 and the consumer device 22 is greater than a distance threshold 34. The distance threshold 34 is the communication range between the second short range transceiver 24 and the third short range transceiver 25 wherein reliable communication may be established.

Referring again to FIG. 3, alternately, the second short range transceiver 24 transmits a gateway message to the third short range transceiver 25 via the second communication gateway 30 if the communication distance is less than the distance threshold 34.

The first short range transceiver 20, the second short range transceiver 24, and the third short range transceiver 25 may be selected from the group that includes one of a BLUETOOTH™ transceiver, an IEEE 802.11 transceiver, and a Near Field Communication network transceiver.

Referring once again to FIG. 1, the control module 12 may include a control module processor 40 coupled to the vehicle 10 effective to determine a vehicle status of the vehicle 10 and control a vehicle function within the vehicle 10. The control module 12 may also include a first RKE receiver 11 configured to provide a control signal to the control module processor 40 in response to a RKE signal 17 from a first RKE transmitter 15 that is spaced apart from the control module 12. The control module 12 may further include a second RKE transmitter 13 configured to receive the vehicle status information from the control module processor 40 and transmit a vehicle status message to a second RKE receiver 16 that is spaced apart from the control module 12. The vehicle status message corresponds to the vehicle status information. The control module 12 may also include a third short range transceiver 25 configured to provide a control signal to the control module processor 40 in response to a gateway message received from the second short range transceiver 24. The control module 12 may be further configured to receive the vehicle status information from the control module processor 40 and communicate the vehicle status information to the second short range transceiver 24.

The fob 14 may include a first short range transceiver 20 configured to communicate with a second short range transceiver 24, that is spaced apart from the fob 14, via a first communication gateway 21 between the first short range transceiver 20 and the second short range transceiver 24. The fob 14 may also include a first RKE transmitter 15 configured to transmit a RKE signal 17 to the first RKE receiver 11, that is spaced apart from the fob 14, in response to the first short range transceiver 20 receiving a gateway message from the second short range transceiver 24. The fob 14 further includes a second RKE receiver 16 configured to receive the RKE signal 17 from a second RKE transmitter 13. The first short range transceiver 20 is configured to transmit the gateway message to the second short range transceiver 24 in response to the second RKE receiver 16 receiving the RKE signal 17.

Continuing to refer to FIG. 1, the fob 14 may further include a first battery charging system 29. The first battery charging system 29 may have a disconnectable connection to an electrical power supply 26 in the vehicle 10. The disconnectable connection may include a first inductive or magnetic resonance antenna 50 that is inductively or magnetically coupleable to a second inductive or magnetic resonance antenna 27 in the vehicle 10 configured to wirelessly provide electrical power from the electrical power supply 26 to the first battery charging system 29 via a second power link 31.

The consumer device 22 may be configured to enable the user to access vehicle status information and control vehicle devices. The consumer device 22 may include a second short range transceiver 24. The consumer device 22 may be configured to transmit a gateway message in response to an action by a user in order to enable the user to control a vehicle function from the consumer device 22. The second short range transceiver 24 may be configured to transmit the gateway message to a first short range transceiver 20 via a first communication gateway 21 if a communication distance between the vehicle 10 and the consumer device 22 is greater than a distance threshold 34. The second short range transceiver 24 is further configured to transmit the gateway message to a third short range transceiver 25 via a second communication gateway 30 between the second short range transceiver 24 and the third short range transceiver 25 if the communication distance is less than the distance threshold 34.

The consumer device 22 may include a user input means to enable the user to select the gateway message. The user input means may consist of dedicated buttons, a reconfigurable button pad, a touch pad display, a voice command detection means, or a motion detection means.

Where the consumer device 22 includes a voice command detection means, the action is a voice command. The voice command detection means may be a voice recognition system that may be built into the consumer device 22 or it may be a software application that can be downloaded to the consumer device 22.

Where the consumer device 22 includes a motion detection means, the action is a predetermined pattern of motions of the consumer device 22. The motion detection means may be a kinetic input device capable of determining movement in one or more axes, e.g. an accelerometer or gyroscope. The kinetic input device also interprets the motion of the consumer device 22 as a desired user input when the consumer device 22 is moved in a predetermined pattern of motions. For example, the kinetic input device may cause the consumer device 22 to send a gateway message to unlock the vehicle doors when the consumer device 22 is turned in a clockwise motion and send a gateway message to lock the doors if the consumer device 22 is turned in a counterclockwise motion.

The consumer device 22 may be further configured to display the vehicle status information in response to receiving a gateway message via the first communication gateway 21 or the second communication gateway 30.

The consumer device 22 is typically powered by an internal consumer device battery 48. The consumer device 22 may further include a second battery charging system 32. The second battery charging system 32 may have a disconnectable connection to an electrical power supply 26 in the vehicle 10. The disconnectable connection may include a third inductive or magnetic resonance antenna 52 that is inductively or magnetically coupleable to a second inductive or magnetic resonance antenna 27 in the vehicle 10 configured to wirelessly provide electrical power from the electrical power supply 26 to the second battery charging system 32 via a second power link 33.

Figure 4:
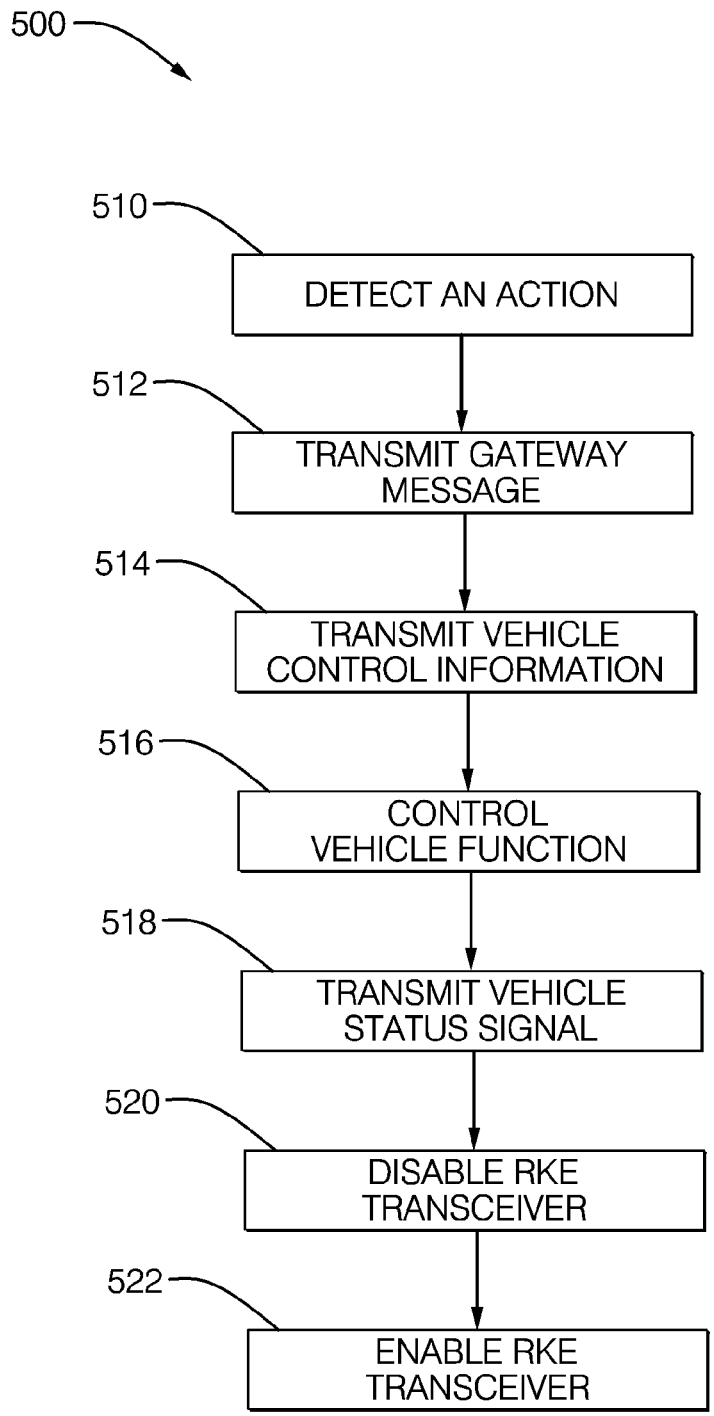
FIG. 4 is a flow chart diagram of a method of controlling a system for communicating with a vehicle in accordance with an embodiment.

Referring now to FIG. 4 that illustrates a non-limiting method 500 of communicating with a vehicle 10 equipped with the control module 12 configured to control a vehicle function in response to the RKE signal 17. The method 500 may include a step 510 DETECT USER ACTION that may include detecting an action by a user of the consumer device 22. The step 510 may include detecting the action via a user input means. The user input means may consist of dedicated buttons, a reconfigurable button pad, a touch pad display, a voice command detection means, or a motion detection means.

The method 500 may include a step 512 TRANSMIT GATEWAY MESSAGE. The step 512 may include transmitting the gateway message between the fob 14 and the consumer device 22 via a first communication gateway 21 when a communication distance between the consumer device 22 and the vehicle 10 is greater than a distance threshold 34. The gateway message may be transmitted between the control module 12 and the consumer device 22 via a second communication gateway 30 when a communication distance between the consumer device 22 and the vehicle 10 is less than a distance threshold 34. The gateway message may be a vehicle command message transmitted from the consumer device 22 to the control module 12 or fob 14 based on the action by the user of the consumer device 22. The gateway message may alternately be a vehicle status message containing vehicle status information transmitted from the control module 12 to the consumer device 22. The gateway message may also be a vehicle status message transmitted from the fob 14 corresponding to a RKE signal 17 containing vehicle status information received by the fob 14 from the control module 12.

The method 500 may include a step 514 TRANSMIT VEHICLE CONTROL INFORMATION. The step 514 may include transmitting a RKE signal 17 from the fob 14 to the control module 12. The RKE signal 17 may contain vehicle control information. The RKE signal 17 may correspond to a gateway message containing vehicle control information transmitted from the consumer device 22 to the fob 14.

The method 500 may include a step 516 CONTROL VEHICLE FUNCTION. The step 516 may include the control module 12 controlling the vehicle function in response to the action by the user of the consumer device 22. The control module 12 may be configured to control a vehicle function in response to the RKE signal 17 received from the fob 14. The control module 12 may be coupled to the vehicle 10 effective to control a device within the vehicle 10 in response to the RKE signal 17. The RKE signal 17 may correspond to a gateway message transmitted from the consumer device 22 to the fob 14.

The method 500 may include a step 518 TRANSMIT VEHICLE STATUS SIGNAL. The step 518 may include transmitting a RKE signal 17 corresponding to vehicle status information from the control module 12 to the fob 14. The vehicle status signal may be transmitted in response to an action by the user of the consumer device 22 or the vehicle status signal may be transmitted by the control module 12 automatically in response to a change in vehicle status.

The method 500 may include a step 520 DISABLE RKE TRANSCEIVER. The step 520 may include transmitting a gateway message from the consumer device 22 to the fob 14 commanding the fob 14 to disable the second RKE transceiver 38 when a communication distance between the consumer device 22 and the vehicle 10 is less than a distance threshold 34. Alternately, the gateway message may command the fob 14 to disable the first RKE transmitter 15 and the second RKE receiver 16 if the fob 14 is so configured.

The method 500 may include a step 522 ENABLE RKE TRANSCEIVER. The step 522 may include transmitting a gateway message from the consumer device 22 to the fob 14 commanding the fob 14 to enable the second RKE transceiver 38 when a communication distance between the consumer device 22 and the vehicle 10 is greater than a distance threshold 34. Alternately, the gateway message may command the fob 14 to enable the first RKE transmitter 15 and the second RKE receiver 16 if the fob 14 is so configured.

Many available consumer devices 22 have touch sensitive reconfigurable displays and the ability to download and run software applications (e.g. smart cellular phones, tablet computers, music players). The touch sensitive reconfigurable displays allow the consumer devices 22 to effectively have an infinite number of buttons. The number of buttons 18 on a fob 14 are typically very limited (i.e. 4 to 8 buttons). The software applications for the consumer device 22 can be easily obtained, such as by downloading from physical media (e.g. CD-ROM), downloading from an Internet web site, or a cellular phone service provider, etc. By utilizing these consumer device capabilities, the system 8 can provide a variety of vehicle control and vehicle status functions through software applications. See the example software applications in the succeeding paragraphs.

A software application may allow a user to access the vehicle status and display the current status of the doors (locked/unlocked), windows (closed//percent open), lift gate (open/closed), tire pressure (normal/low/actual pressure), engine (on/off/RPM), outside air temperature, inside air temperature, HVAC settings, radio settings, and navigation information. The vehicle status information may also include environmental information such as average fuel economy, average speed, and acceleration/deceleration ratings. The vehicle status information may be presented in a numerical format, graphical format, or both.

Another software application may display vehicle alerts transmitted to the consumer device 22 by the control module 12. The alerts may be based on diagnostic messages from the various vehicle systems such as engine and transmission, emissions system, brake system, tire pressure monitoring system, airbag system, fuel level, or windshield washer fluid level.

A further example of a software application may allow a user to control the vehicle functions typically controlled by the fob 14 such as door lock/unlock, remote start/stop engine, windows up/down, sunroof open/close, lift gate open/close, horn. The vehicle status message can then verify to the user and display that the requested function has occurred. A graphical representation of the fob 14 and the fob buttons 18 may be shown on the consumer device 22.

When the vehicle 10 is equipped with a navigation system, a software application may help a user locate his vehicle 10. The system 8 may transmit the GPS coordinates of the vehicle 10 to the consumer device 22 following a user command. The consumer device 22 may access an internal GPS receiver is so configured to determine the consumer device's 22 location and calculate the distance and direction to the vehicle 10. Additionally a map of the area may be downloaded to the consumer device 22 via a wireless Internet connection so that the user's location and the location of the vehicle 10 can be superimposed on a display of the map.

By including the first short range transceiver 20 within the fob 14, a consumer device 22 can control vehicle functions and access vehicle status at distance of up to 200 meters without subscription fees as would be required if a communication link between the consumer device 22 and the vehicle 10 were provided by cellular telephone networks. Additional receivers may not be required to be added to the vehicle 10, since the first RKE receiver 11 already installed in the vehicle 10 for remote keyless entry may be used. The buttons, displays, and touch pads that are part of the consumer device 22 may be used for human to machine interface between the fob 14 and the vehicle 10 reducing or eliminating the need for buttons 18 and displays in the fob 14, possibly reducing the size and the cost of the fob 14.

Additionally, including a third short range transceiver 25 in the control module 12 allows conservation of the fob battery's 46 power when the consumer device 22 is within close proximity of the vehicle 10. It also enables the user to access the vehicle functions and vehicle status directly from the consumer device 22 without the need to have the fob 14 present. This may be useful in several different scenarios. For example, if the keys and fob 14 are accidentally locked in the vehicle 10, the user can unlock the doors via the consumer device 22 and retrieve the keys.

Another useful example is the ability to unlock the vehicle 10 with a changeable access code. The user could program an access code into the control module 12 via the consumer device 22. The user could then provide the access code to another person, for example a friend or vehicle service technician so that they could enter the access code into a different consumer device in communication with the vehicle 10 and unlock the vehicle 10. By entering the proper access code, a user may also be able to start and drive the vehicle 10.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A system for communicating with a vehicle comprising:
a control module configured to be mounted in the vehicle, said control module comprising a first RKE receiver, said control module further configured to control a vehicle function in response to a RKE signal received by the first RKE receiver;
a fob equipped with a RKE transmitter and a first short range transceiver, wherein said first RKE transmitter is configured to transmit the RKE signal in response to the first short range transceiver receiving a gateway message via a first communication gateway; and
a consumer device equipped with a second short range transceiver, wherein the consumer device is configured to transmit the gateway message to the first short range transceiver via the first communication gateway in response to an action by a user, and thereby enable the user to control the vehicle function from the consumer device via the fob, wherein
the second short range transceiver communicates the gateway message to the first short range transceiver via the first communication gateway if a communication distance between the vehicle and the consumer device is greater than a distance threshold, and the second short range transceiver transmits the gateway message to the third short range transceiver via the second communication gateway if the communication distance is less than the distance threshold.

2. The system in accordance with claim 1, wherein the control module is equipped with a second RKE transmitter, the fob is equipped with a second RKE receiver, and said system is further configured to communicate a vehicle status message from the control module to the consumer device via the fob.

3. The system in accordance with claim 1, wherein the first short range transceiver and the second short range transceiver include one of a BLUETOOTH™ transceiver, an IEEE 802.11 transceiver, and a Near Field Communication network transceiver.

4. The system in accordance with claim 1, wherein the control module further comprises a third short range transceiver configured to receive the gateway message via a second communication gateway, wherein the consumer device is configured to transmit the gateway message to the third short range transceiver via the second communication gateway in response to the action by the user and thereby enable the user to control the vehicle function from the consumer device without the fob, wherein the system is configured such that the second short range transceiver communicates the gateway message to the first short range transceiver via the first communication gateway if a communication distance between the vehicle and the consumer device is greater than a distance threshold, and the second short range transceiver transmits the gateway message to the third short range transceiver via the second communication gateway if the communication distance is less than the distance threshold.

5. The system in accordance with claim 4, wherein the third short range transceiver includes one of a BLUETOOTH™ transceiver, an IEEE 802.11 transceiver, and a Near Field Communication network transceiver.

6. A consumer device configured to enable a user to access vehicle status information and control vehicle devices comprising:
a second short range transceiver, wherein the consumer device is configured to transmit a gateway message to a control module in a vehicle or a fob, said gateway message transmitted in response to an action by the user in order to enable the user to control a vehicle function from the consumer device, wherein the second short range transceiver is configured to transmit the gateway message to a first short range transceiver in the fob via a first communication gateway if a communication distance between the vehicle and the consumer device is greater than a distance threshold, and the second short range transceiver is further configured to transmit the gateway message to a third short range transceiver in the control module via a second communication gateway between the second short range transceiver and the third short range transceiver if the communication distance is less than the distance threshold; and a user input means to enable the user to select the gateway message, wherein the second short range transceiver communicates the gateway message to the first short range transceiver via the first communication gateway if a communication distance between the vehicle and the consumer device is greater than a distance threshold, and the second short range transceiver transmits the gateway message to the third short range transceiver via the second communication gateway if the communication distance is less than the distance threshold.

7. The consumer device in accordance with claim 6, wherein the consumer device is further configured to display the vehicle status information in response to receiving the gateway message via the first communication gateway or the second communication gateway.

8. The consumer device in accordance with claim 6, wherein the second short range transceiver includes one of a BLUETOOTH™ transceiver, an IEEE 802.11 transceiver, and a Near Field Communication network transceiver.

9. The consumer device in accordance with claim 6, wherein the consumer device further comprises a voice command detection means, and the action is a voice command.

10. The consumer device in accordance with claim 6, wherein the consumer device further comprises a motion detection means, and the action is a predetermined pattern of motions of the consumer device.

11. A method of communicating with a vehicle equipped with a control module configured to control a vehicle function in response to a RKE signal, said method comprising steps of:

detecting an action by a user of a consumer device;

transmitting a gateway message to a fob via a first communication gateway, wherein said gateway message is based on the action;

transmitting the RKE signal corresponding to the gateway message from the fob to the control module; and controlling the vehicle function in response to the action, wherein transmitting the gateway message to the fob occurs when a communication distance between the consumer device and the vehicle is greater than a distance threshold, said method further comprising a step of transmitting the gateway message from the consumer device to the control module via a second communication gateway when the communication distance is less than the distance threshold.

12. The method of claim 11 further comprising the steps of:

transmitting the RKE signal corresponding to vehicle status information from the control module to the fob; and transmitting the gateway message corresponding to the RKE signal transmitted from the fob to the consumer device.

13. The method of claim 11 further comprising the step of disabling a second RKE transceiver when the gateway message is transmitted from the consumer device to the control module.

14. The method of claim 11 further comprising the step of transmitting a vehicle status message from the control module to the consumer device.

15. The method of claim 11 further comprising the step of enabling a second RKE transceiver when the communication distance between the vehicle and the consumer device is greater than the distance threshold.

* * * * *